Sept. 8, 1931. E. F. ZAPARKA 1,822,185
CONTROLLING DEVICE FOR VEHICLE SPRING SUSPENSION SYSTEMS
Filed March 30, 1929. 3 Sheets-Sheet 1
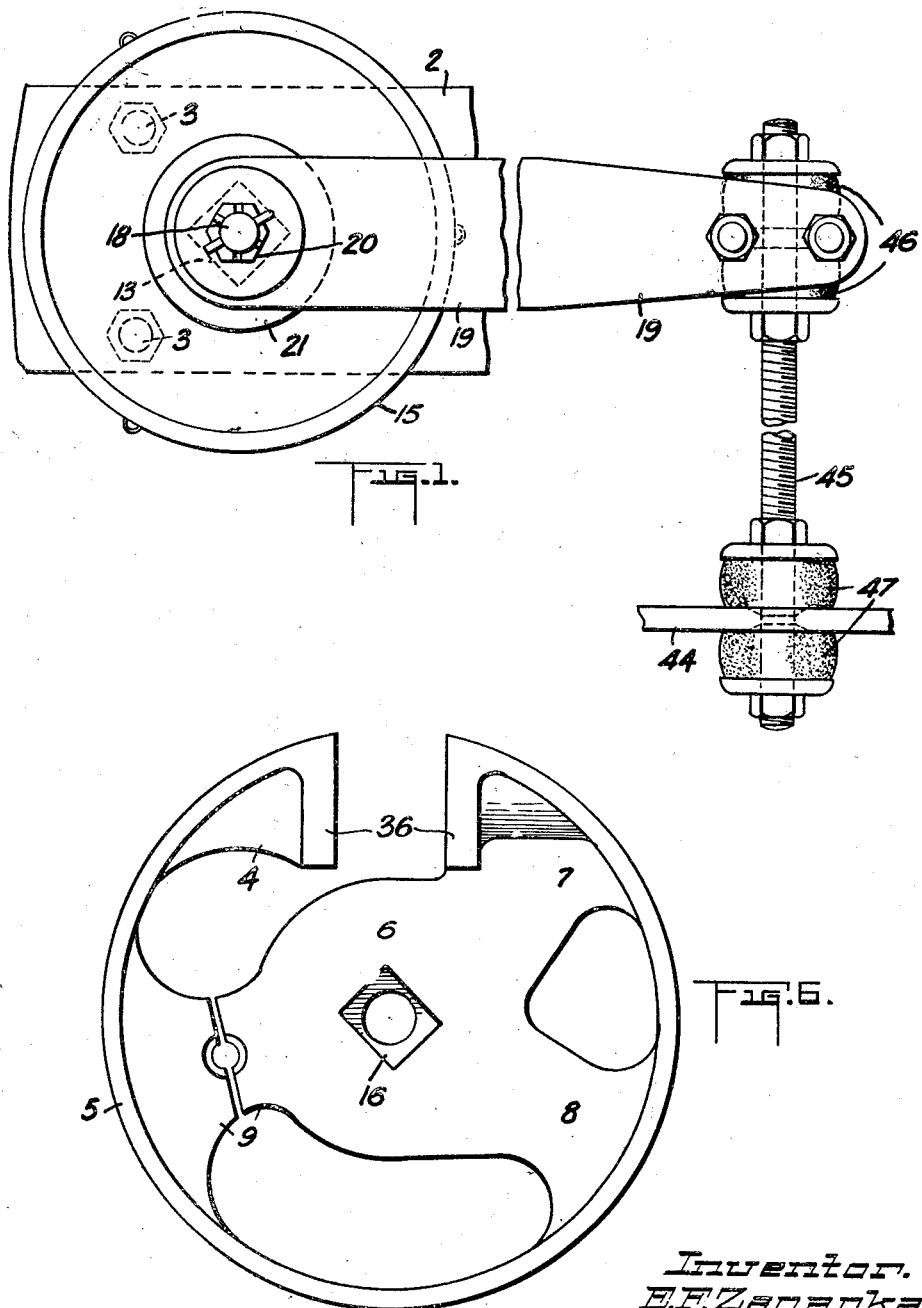
Inventor.
E. F. Zaparka Sept. 8, 1931.                  E. F. ZAPARKA                  1,822,185
             CONTROLLING DEVICE FOR VEHICLE SPRING SUSPENSION SYSTEMS
                    Filed March 30, 1929          3 Sheets—Sheet 2
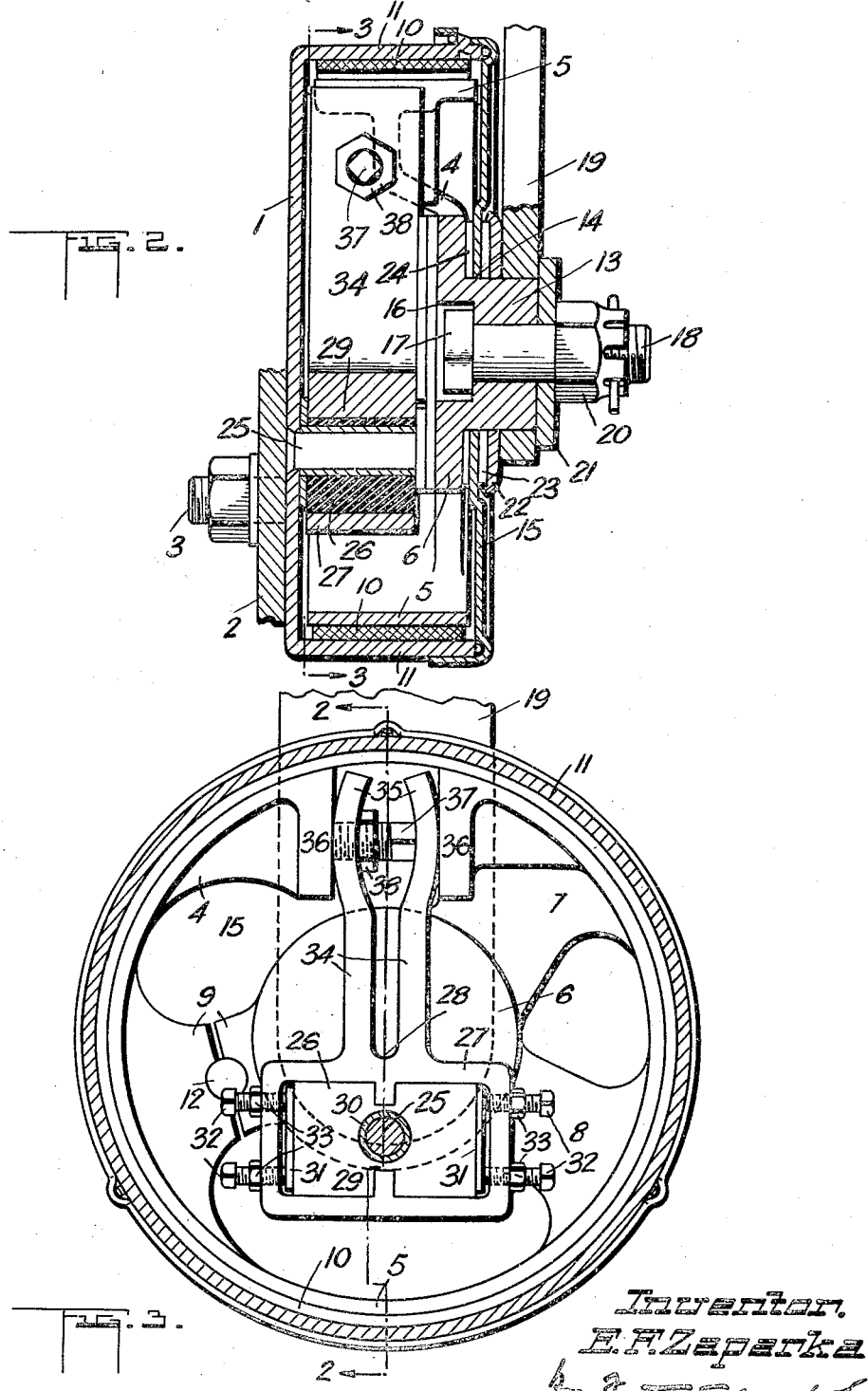
Inventor.
E. F. Zaparka Sept. 8, 1931.  E. F. ZAPARKA  1,822,185
CONTROLLING DEVICE FOR VEHICLE SPRING SUSPENSION SYSTEMS
Filed March 30, 1929   3 Sheets-Sheet 3
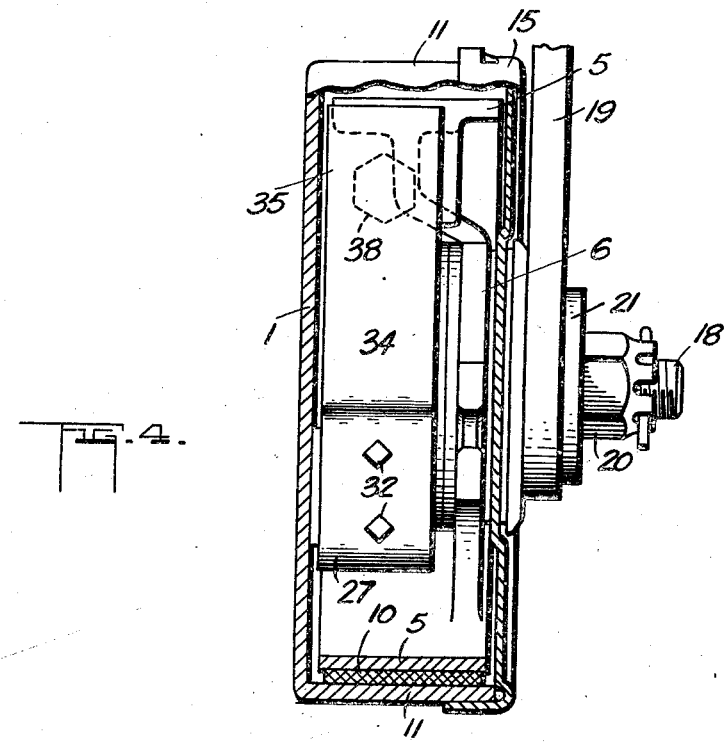
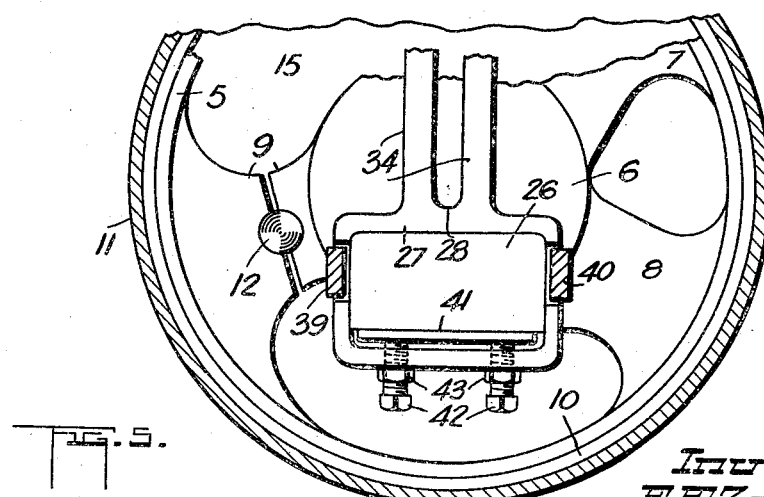
Inventor.
E. F. Zaparka Patented Sept. 8, 1931

1,822,185

UNITED STATES PATENT OFFICE

EDWARD F. ZAPARKA, OF NEW YORK, N. Y., ASSIGNOR TO LEOPARD AUTOMOBILE PRODUCTS CORPORATION, OF NEW YORK, N. Y., A CORPORATION

CONTROLLING DEVICE FOR VEHICLE SPRING SUSPENSION SYSTEMS

Application filed March 30, 1929. Serial No. 351,322.

My invention relates to improvements in controlling devices for vehicle spring suspension systems and particularly to devices of this class in which mechanical friction is used to dissipate the energy stored in the spring when a road irregularity is encountered, and to control the relative movement between the axle and spring suspended part of the vehicle.

The general object of the invention is to provide a device which will dissipate the energy of the spring caused by road irregularities without undue or too rapid movement of the vehicle chassis and attached body or undue departure from the normal horizontal line of its movement.

A further object is to provide a very simple and effective means for actuating one of the friction elements into engagement with the other friction element whereby the pressure of such element on the other will be applied with an accelerating rate of gain and released with accelerating rate of loss.

A still further object is to devise a construction employing a pivoted applicator lever expanding a friction element against its coacting element wherein resilient means is provided between such lever and its pivot for changing the lever fulcrum point.

With the above and other objects, which will hereinafter appear, my invention consists of a controlling device in which the form illustrated is the preferred embodiment of my invention.

In the drawings:

Fig. 1 represents a side elevation of my device showing the same applied to a side member of a chassis frame and connected to the vehicle axle.

Fig. 2 is an enlarged horizontal section through the line 2—2 (Fig. 3.)

Fig. 3 is an enlarged sectional view through the line 3—3 (Fig. 2).

Fig. 4 is a similar section to Fig. 2 only showing the applicator lever, actuating lever and certain other parts in elevation.

Fig. 5 is an enlarged fragmentary sectional view similar to Fig. 3 showing a modified construction of mounting for the applicator lever, and Fig. 6 is an elevational view of the oscillatable friction band assembly.

Like characters of reference indicate corresponding parts in the different views.

A drum 1 similar in form to a brake drum is attached to a side member 2 of a chassis frame by any suitable means, such as by the bolts 3.

A friction band assembly 4 includes a split band 5 connected to a central hub portion 6 by arms 7, 8 and 9, said friction band assembly being inserted into the drum 1. If desired, a brake or friction lining 10 may be interposed between the inner face of the drum wall 11 and the exterior face of the band 5.

The arm 9 is split transversely and a headed rivet 12 is inserted between the split portions to prevent the brake band assembly decreasing its normal diameter and to hold the portions of the arm 9 in alignment.

The brake band assembly is preferably constructed with the arms 7, 8 and 9, the band 5 and the central hub portion 6 formed integrally.

Referring to Fig. 3 of the drawings, the right hand portion of the band is a substantially rigid portion while the left hand portion is capable of being expanded so as to increase the diameter of the band the requisite extent.

The hub portion 6 of the band assembly is provided with a hollow boss 13 with a squared extremity which protrudes freely through an orifice 14 in the cover 15 of the drum 1, said boss and orifice being centrally located. A rectangular socket 16 is disposed in the inner face of the central portion 6 and receives the rectangular head 17 of a bolt 18 which extends forwardly through the hollow boss and protrudes therefrom, said bolt, therefore, turning with the band assembly. An actuating lever 19 is secured to the boss 13 by means of the bolt 18 and nut 20, a washer 21 being preferably interposed between the lever and the nut.

Washers 22, 23 and 24 are disposed between the lever 19 and the cover 15 and between the cover 15 and hub portion 6 to make the cover weather and dust proof.

A stud or pivot pin 25 extending forwardly into the drum is secured thereto in a position offset from the axial line of the friction band assembly and drum which are disposed concentrically, and upon this stud is carried a member 26 of resilient material, such as rubber. The rectangular ring shaped end or yoke 27 of the applicator lever 28 extends about the member 26, such member being inserted into the supporting seat or pocket provided therefor in the yoke. Inwardly extending lugs 29 (Fig. 3) are provided in the yoke 27 of the applicator lever for retaining the member 26 in the centered position.

A bushing 30 is interposed between the stud 25 and the surrounding resilient member 26.

Pressure plates 31 (Fig. 3) are inserted between the ends of the resilient member 26 and the ends of the ring shaped applicator lever and member 27 and set screws 32 with lock nuts 33 are threaded through the ends of the member 27 and bear against the plates to provide a means for compressing the resilient member 26.

The applicator lever 28 has two spaced apart arms 34 extending inwardly from the ring shaped member 27, such arms having preferably slightly bowed ends 35 which are adapted to engage abutments 36 on the ends of the split friction band 5. A set screw 37, having a lock nut 38, is threaded into one of the arms 34 and its free end engages the other applicator lever arm 34. Thus the distance between the two arms 34 can be varied to vary correspondingly the initial pressure exerted by the band 5 upon the friction lining 10 or drum wall 11 where the lining is absent.

In the modification illustrated in Fig. 5 there is no central stud 25 extending through the resilient member 26. Such stud is replaced by two spaced apart studs 39 and 40 protruding forwardly into the drum to the main portion of which they are secured. The studs 39 and 40 in this form of the invention engage the ends of the resilient member 26. There is a single pressure plate 41 (Fig. 5) at the bottom of the member 26 and two set screws 42 with lock nuts 33 are threaded through the bottom portion of the ring shaped member 27 for compressing the member 26 vertically instead of laterally as described in connection with the form shown in Fig. 3 of the drawings.

The actuating lever 19 is connected at its free end to an axle member 44 by any suitable means, such as the connection illustrated in Fig. 1, which consists of a rod 45 and flexible joints 46 and 47 respectively connecting the rod to the actuating lever end and to the axle member 44.

I will now describe the operation of my device. Referring, for convenience, to Fig. 3 of the drawings the device is so arranged and connected up that the band assembly 4 will be rotated in such a direction that the rigid end of the friction band 5 is the leading end when the axle moves from its normal horizontal position towards the chassis. In Fig. 3 the band assembly would thus move in a counter-clockwise direction upon such corresponding movement of the axle. When this occurs, owing to the fulcrum point of the applicator lever 28 being offset with respect to the axis of the band assembly, the arms 34 thereof will spread apart the ends of the band 5 thus exerting increasing pressure of the band on the drum which will cause the application of frictional resistance with an accelerating rate of gain as the band assembly continues to swing away from its normal position. During such swinging of the band assembly 4 there will be a tendency for the applicator lever 28 to have its fulcrum point displaced upwardly so that such fulcrum point will be then disposed somewhere intermediately between the stud 25 and the axis of the band assembly, with the result that the ring shaped member 27 will move to the right, compressing the left hand portion of the resilient member 26 an amount depending upon the angular displacement of the applicator lever which in turn depends upon the extent of swing of the band assembly. The right hand part of the resilient member 26 is simultaneously equivalently expanded. The extent of swing of the band assembly is, of course, controlled by the amount of movement of the axle with respect to the chassis.

As the axle moves back to its normal position, the band assembly is rotated in a clockwise direction with the result that the pressure of the band 5 on the drum is released with an accelerating rate of loss. During movement in this direction the free end of the band 5 becomes the leading end and thus there is comparatively greater pressure exerted by the band upon drum on the return stroke owing to the wrapping or servo effect produced. As the band assembly returns to its normal position the applicator lever is restored to its normal position, the left hand portion of the resilient member 26 expanding back to normal, and the right hand portion contracting likewise.

Upon the axle moving below its normal horizontal axial line, the band assembly as illustrated will be rotated by the axle connected actuating lever in a clockwise direction and thus the applicator lever will be swung to the right with the result the band 5 is increased in diameter as described above and increasing pressure is exerted by the band on the drum which will offer frictional resistance with an accelerating rate of gain to the former's movement. There will be a wrapping or servo effect owing to the free end of the band 5 being the leading end during this rotation. Thus the pressure of band on drum will be greater as the axle is moving below and away from its normal axial line than when it is returning towards its normal position from a position below such normal line.

During the swing of the band assembly in a clockwise direction from its normal position the right hand portion of the resilient member 26 is compressed and the left hand portion correspondingly expanded as the lever is moved from its normal fulcrum point and, as such applicator lever is restored to its normal position upon the band assembly moving back to normal in a counter-clockwise direction, such portions of the resilient member 26 resume their normal positions.

As above stated compression of the portions of the resilient member 26 will carry with it an equivalent expansion of their complementary portions in the form shown in Fig. 3.

In the modified form (Fig. 5) displacement of the fulcrum point of the applicator lever 28 causes one or other of the studs 39 or 40 to engage the corresponding end of the resilient member 26 and compress the same as a whole against the other stud.

By altering the adjustment of the setscrews 32 or 42 the pressure of the band upon the drum can be varied.

Furthermore, in the case of the form shown in Fig. 3 the pressure during one part of the cycle of operation of the spring controlling device can be arranged to be greater or less than the pressure during the other part of the cycle. This can be achieved by adjusting one pair of setscrews more or less than the other pair.

As many modifications may be made in the invention without departing from the spirit of the same or the scope of the appended claims, the forms shown are to be construed in an illustrative and not in a limiting sense.

What I claim as my invention is—

1. In a controlling device for vehicle spring suspension systems, in combination, two friction elements, a pivoted applicator lever for causing one friction element to exert pressure on the other, a supporting pivot pin for said applicator lever and resilient means inserted between the lever and its pivot for permitting such lever upon being swung to change its fulcrum point to actuate the element coacting therewith.

2. In a controlling device for vehicle spring suspension systems, in combination, two friction elements, one of which is movable with respect to the other, a pivoted applicator lever for causing the movable friction element to exert pressure upon the other friction element, a supporting pivot pin for said applicator lever, and resilient means inserted between the lever and its pivot for permitting such lever upon being swung to change its fulcrum point to actuate the element coacting therewith.

3. In a controlling device for vehicle spring suspension systems, in combination, a drum, an internal expandible oscillatable friction element inserted into the drum, means for oscillating the expandible friction element, a pivoted applicator lever operatively engaging the expandible friction element for causing the expandible friction element to increase its diameter upon being moved from its normal position, and resilient means between the applicator lever and its pivot for permitting such lever to alter its fulcrum point upon being swung by the oscillatable friction element.

4. In a controlling device for vehicle spring suspension systems, in combination, a drum, an internal expandible oscillatable friction element inserted into the drum, means for oscillating the expandible friction element, an applicator lever operatively engaging the expandible friction element for increasing its diameter upon its being moved from its normal position, a pivot pin secured to the drum and inserted into a recess in the lever, and resilient means interposed between pin and lever for changing the fulcrum point of the lever upon its being swung by the expandible friction element.

5. In a controlling device for vehicle spring suspension systems, in combination, a drum, an expandible split friction band assembly oscillatably mounted within the drum, means for oscillating the band assembly, an applicator lever having its free end inserted between the ends of the split band assembly for increasing its diameter upon its being moved from its normal position, a pivot pin secured to the drum and extending into a recess in the lever and being eccentrically disposed to the axis of said friction band assembly, and resilient means interposed between pin and lever for changing the fulcrum point of the latter upon its being swung by the expandible friction element.

6. In a controlling device for vehicle spring suspension systems, in combination, a drum, an expandible split friction band assembly oscillatably mounted within the drum, means for oscillating the band assembly, an applicator lever having its free end inserted between the ends of the split band assembly for increasing its diameter upon its being moved in either direction from its normal position, a pivot pin secured to the drum and extending into a recess in the lever, and resilient means interposed between pin and lever for changing the fulcrum point of the latter upon its being swung by the expandible friction element.

7. In a controlling device for vehicle spring suspension systems, in combination, a drum, an expandible split friction element oscillatable therein, means for oscillating the friction element, an applicator lever inserted between the free ends of the friction element, a pivot pin in the drum extending into a recess in the lever and being eccentrically disposed to the axis of said friction band assembly and a resilient member extending around the pin and between it and the lever.

8. In a controlling device for vehicle spring suspension systems, in combination, a drum, an expandible split friction element oscillatable therein, means for oscillating the friction element, an applicator lever inserted between the free ends of the friction element, a pivot pin in the drum extending into the lever, a resilient member extending around the pin and between it and the lever, and means for compressing the resilient member.

9. In a controlling device for vehicle spring suspension systems, in combination, a drum, an expandible split friction element oscillatable therein, means for oscillating the friction element, an applicator lever inserted between the free ends of the friction element, a pivot pin in the drum extending into a recess in the lever and being eccentrically disposed to the axis of said friction band assembly, a resilient member extending around the pin and between it and the lever, and adjustable means for compressing the resilient member.

10. In a controlling device for spring suspension systems, in combination, a friction drum, an expandible split friction element oscillatable in said drum, means for oscillating said friction element, an applicator lever for said friction element having a recessed connecting yoke, a pivot pin on the drum extending into said recess, a resilient member within said recess and extending around said pin and between the latter and the yoke, and means within said recess for compressing said resilient member.

11. In a controlling device for spring suspension systems, in combination, a friction drum, an expandible split friction element oscillatable in said drum, means for oscillating said friction element, an applicator lever for said friction element, having a recessed connecting yoke, a pivot pin on the drum extending into said recess, a resilient member within said recess and extending around said pin and between the latter and the yoke, means within said recess for compressing said resilient member, and set screws carried by said yoke and engaging said compressing means.

12. In a controlling device for spring suspension systems, in combination, a friction drum, an expandible split friction element oscillatable in said drum, means for oscillating said friction element, an applicator lever for said friction element having a recessed connecting yoke, a pivot pin on the drum extending into said recess, a resilient member within said recess and extending around said pin and between the latter and the yoke, means within said recess for compressing said resilient member, and a pair of spaced-apart arms extending from said yoke and respectively engaging the ends of the split friction element.

13. In a controlling device for spring suspension systems, in combination, a friction drum, an expandible split friction element oscillatable in said drum, means for oscillating said friction element, an applicator lever for said friction element having a recessed connecting yoke, a pivot pin on the drum extending into said recess, a resilient member within said recess and extending around said pin and between the latter and the yoke, means within said recess for compressing said resilient member, a pair of spaced arms extending outwardly from said yoke, being integral with the latter, and respectively engaging the ends of the split friction element, and means for adjusting the distance between the free ends of said arms.

EDWARD F. ZAPARKA.

CERTIFICATE OF CORRECTION.

Patent No. 1,822,185.                          Granted September 8, 1931, to

EDWARD F. ZAPARKA.

It is hereby certified that error appears in the printed specification of the above numbered patent requiring correction as follows: Page 3, line 77, claim 3, before "and" insert the clause a supporting pivot pin for said applicator lever,; and that the said Letters Patent should be read with this correction therein that the same may conform to the record of the case in the Patent Office.

Signed and sealed this 8th day of December, A. D. 1931.

M. J. Moore,
Acting Commissioner of Patents.

(Seal)